United States Patent [19]

Satoh et al.

[11] Patent Number: 4,699,530

[45] Date of Patent: Oct. 13, 1987

[54] THRUST BALL BEARING UNIT

[75] Inventors: Eiji Satoh, Fujisawa; Mararu Iwakura, Ayase; Hiroto Kamimura, Fujisawa; Yasunori Nishi, Fujisawa; Masamitsu Kojima, Fujisawa, all of Japan

[73] Assignee: Oiless Industry Co., Ltd., Tokyo, Japan

[21] Appl. No.: 880,316

[22] Filed: Jun. 30, 1986

[30] Foreign Application Priority Data

Jun. 28, 1985 [JP] Japan ............................. 60-99740[U]
Jun. 29, 1985 [JP] Japan ............................. 60-99291[U]

[51] Int. Cl.[4] ...................... F16C 19/10; F16C 27/04; B60G 11/42
[52] U.S. Cl. .................................. 384/609; 384/611; 384/615; 280/668
[58] Field of Search .................... 384/215, 452–455, 384/480, 592, 593, 607, 609–617; 280/668, 670, 673, 692, 696, 724

[56] References Cited

U.S. PATENT DOCUMENTS

| Re. 31,184 | 3/1983 | Lederman | 280/668 |
|---|---|---|---|
| 3,525,557 | 8/1970 | Willing | 384/617 |
| 4,325,566 | 4/1982 | Stephan | 280/668 |
| 4,462,608 | 7/1984 | Lederman | 280/668 |
| 4,497,523 | 2/1985 | Lederman | 384/615 |
| 4,541,744 | 9/1985 | Lederman | 384/615 X |

FOREIGN PATENT DOCUMENTS

| 2658748 | 6/1978 | Fed. Rep. of Germany . | |
| 2834528 | 2/1980 | Fed. Rep. of Germany | 280/668 |
| 77-39083 | 12/1977 | France . | |
| 63143 | 5/1981 | Japan | 280/668 |

Primary Examiner—Stuart S. Levy
Assistant Examiner—Thomas R. Hannon
Attorney, Agent, or Firm—Wenderoth, Lind & Ponack

[57] ABSTRACT

A thrust ball bearing unit has a pair of ringed cylindrical upper and lower casings, each casing being made of synthetic resin, a pair of upper and lower races, and a buffer interposed between the upper casing and the upper race or between the lower race and the lower casing. Alternatively, two buffers are interposed between the upper casing and the upper race and between the lower race and the lower casing respectively. The upper and lower casings have peripheral sealing portions which are in a labyrinth or contact seal relationship with each other.

8 Claims, 16 Drawing Figures

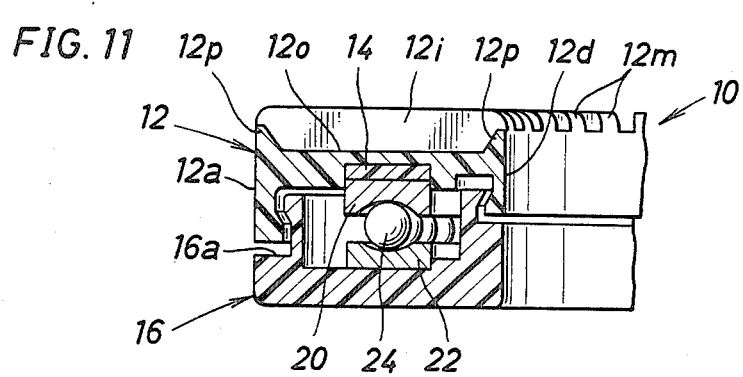
FIG. 11
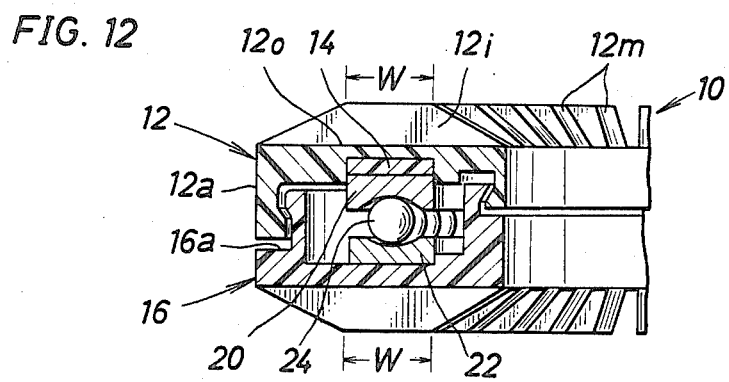
FIG. 12
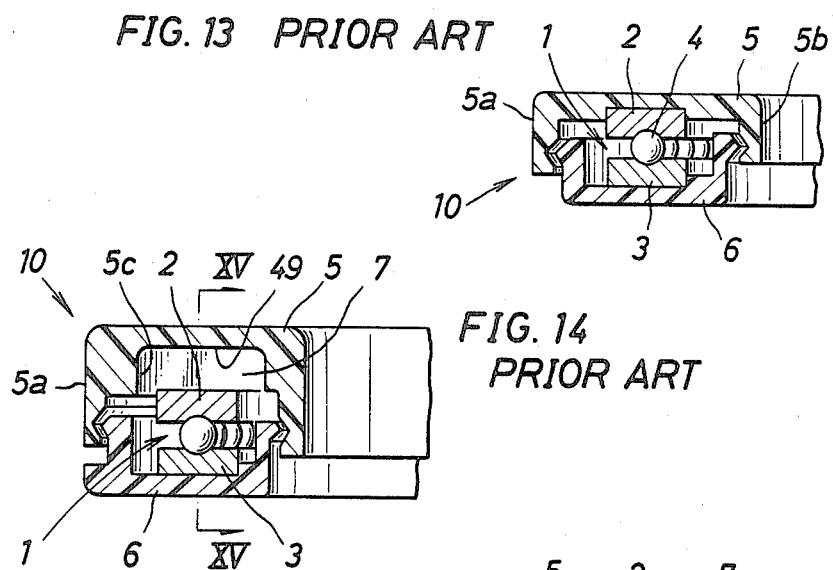
FIG. 13 PRIOR ART
FIG. 14 PRIOR ART
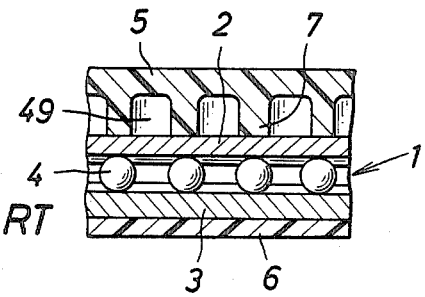
FIG. 15 PRIOR ART

THRUST BALL BEARING UNIT

BACKGROUND OF INVENTION

1. Field of Invention

This invention relates to a thrust ball bearing unit, and more particularly to an improved thrust ball bearing unit for use in a suspension of an automobile.

2. Description of the Prior Art

Numerous types of thrust ball bearing units are known in the prior art for use in a suspension of an automobile and the like. For example, a thrust ball bearing unit of this type is known from DE-GM No. 26 58 748.4 and French Patent Application No. 77-39083.

Thrust ball bearing units are widely used in MacPherson strut type automobile suspensions, and most parts which are in direct contact with the thrust ball bearings are made of sheet metal so that dimensional tolerances with respect to flatness are low, and the thrust ball bearings are in cantilever contact with races, thus resulting in problems such as fretting corrosion due to minor slip as well as noise.

There is another problem in that muddy water disperses into a tire housing of the automobile and rusts the seal plate, and rust or dust thus intruding into the sliding channel may damage the ball bearings.

In order to overcome the conventional disadvantages, a plurality of evenly spaced metal thrust ball bearings are rotatably held into an integral synthetic resin casing. As shown in FIGS. 13–16, a thrust ball bearing 4 is rotatably held between an upper race 2 and a lower race 3 which are covered by an upper casing 5 and a lower casing 6.

An embodiment of the MacPherson strut type automobile suspension is shown in FIG. 16, wherein a thrust ball bearing unit 10 including a pair of thrust ball bearings 1 is integrally enclosed in a synthetic resin casing, and more particularly an upper mount 34 is secured to an inner wall of a body 33 by a mounting screw bolt 47 and a nut 47a, a rod end plate 32 is provided on the upper mount 34 by a rubber mount 35, a screwed end portion of a shock absorber rod 37 is inserted into an opening of the rod end plate 32 and a screw nut 38 is screwed on the screwed end portion of the rod 37.

The upper casing 5 is inserted into a cylindrical portion 45 of the upper mount 34 which serves as a bearing holder as well. A cylindrical portion 41 of a spring seat 39 is inserted into an inner periphery of a lower casing 6 of the thrust ball bearing, an end portion of a coil spring 42 is inserted into an elastic seat 40, and another end of the coil spring 42 is held by a spring seat 44.

High dimensional tolerances related to leveling are required for the members enclosing the thrust ball bearings. Sheet metal is usually push-fitted into the upper mount 34 of the suspension so that a dimensional tolerance threat is low, and stress is imparted to the sliding channels of the inner and outer races which causes a longitudinal scar to be formed along the sliding channels.

To this end, there has been proposed another thrust ball bearing unit having its enclosure previously processed to be flat and level and mounted on the upper mount 34 or on the spring seat 44. But a head of the bolt 47 securing the upper mount 34 to the body 33 projects outwardly so that the thickness of the upper casing 5 becomes uneven so as to cause cambering during processing.

In order to overcome this disadvantage, a thrust ball bearing shown in FIG. 14 has been proposed, wherein an annular groove 49 is formed in an upper casing 5, a number of ribs 7 are radially provided in the annular groove 49 with the center of the bearing as their centers, and an upper race 2 having a number of equally spaced ball bearings 4 is brought into contact with these ribs 7, but the ribs are not formed at a portion through which a head of the fastening bolt 47 is located.

In the thrust ball bearing unit shown in FIGS. 13–15, an upper face which is in contact with a lower face of the upper casing 5 is flat so that ill-balanced impact is imparted to the thrust ball bearing 4 due to a rough seat of the upper mount 34, although the upper casing 5 is made of synthetic resin. This is presumably the reason why a number of ribs 7 are provided at equal spaces between an outer peripheral wall 5a and an inner peripheral wall 5b of the upper casing 5 so as to increase stiffness of the bearing unit, and even if the upper and lower races 1 and 2 are even, the upper casing 5 is not distorted appreciably in accordance with the roughness of the upper mount 34.

When such a thrust ball bearing unit having a synthetic resin casing which includes thrust ball bearings is used for a load splitting type suspension mounted directly on the body 33, the upper and lower races 2 and 3 are distorted which causes rolling vibrations and which causes minor rolling vibrations to be transmitted to the body 33.

SUMMARY OF THE INVENTION

A primary object of this invention is to provide a thrust ball bearing unit including a pair of synthetic resin casings, a series of thrust ball bearings and a buffer interposed between the casings and the thrust ball bearings whereby distortion of the synthetic resin casings caused by a mounting member can be absorbed without distorting the races of the thrust ball bearings.

Another object of this invention is to provide a thrust ball bearing unit whereby impact load applied to the thrust ball bearing unit can be absorbed without being transmitted to the thrust ball bearings.

Another object of this invention is to provide a thrust ball bearing unit whereby rolling vibration of the thrust ball bearing can be absorbed without being transmitted to the races.

Another object of this invention is to provide a thrust ball bearing unit whereby a possible noise or vibration caused by worn thrust ball bearings after long use can be absorbed by a buffer or by synthetic resin casings.

Another object of this invention is to provide a thrust ball bearing unit which has an increased load carrying capacity and improved dustproof effect, and is more efficient than the thrust ball bearing unit of the prior art.

A further object of this invention is to provide a thrust ball bearing unit having a simple and small construction.

Still another object of this invention is to provide a thrust ball bearing unit that is relatively inexpensive, is easy to make and to operate, and can be maintained at a relatively low cost.

BRIEF DESCRIPTION OF THE DRAWINGS

These and other objects and advantages are obtained by the invention, which is described hereinbelow in connection with the accompanying drawings, wherein:

FIG. 11 is a partial sectional view of another embodiment of a thrust ball bearing unit according to the present invention;

FIG. 12 is a partial sectional view of still another embodiment of a thrust ball bearing unit according to the present invention;

FIG. 13 is a partial longitudinal sectional view of a conventional thrust ball bearing unit;

FIG. 14 is a partial longitudinal section view of another embodiment of a conventional thrust ball bearing unit;

FIG. 15 is a partial longitudinal section view of a thrust ball bearing unit taken along line V—V of FIG. 14;

DETAILED DESCRIPTION OF THE PREFERRED EMBODIMENTS

Figure 1:
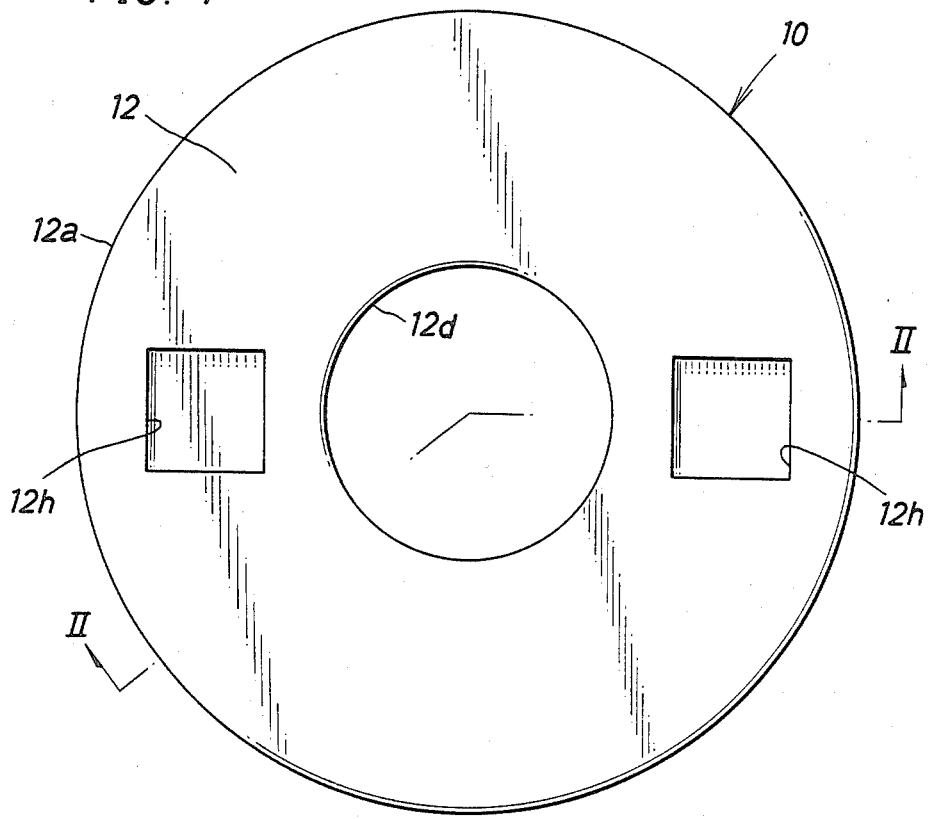
FIG. 1 is a plan view of a thrust ball bearing unit according to the present invention.

Turning now to the drawings, there is shown a thrust ball bearing unit 10 for use with a shock absorber rod 37. A ringed upper cylindrical casing 12 includes an outer peripheral wall 12a having an inwardly extending lip 12b, an annular cavity 12c formed downwardly, an inner peripheral wall 12d having an annular narrow dent portion 12e, an outwardly extending lip 12f formed along a bottom of the inner peripheral wall 12d, cylindrical wall 12g extending along the annular cavity 12c and a pair of dent portions 12h formed diametrically in an upper face of the upper cylindrical casing 12.

A ringed lower cylindrical casing 16 includes a peripheral dent portion 16a, an outer peripheral wall 16b having an outwardly extending lip 16c, an annular cavity 16d, an inner peripheral wall 16e having an inwardly extending lip 16f, a cylindrical wall 16g, and an inner peripheral dent portion 16h which are complementary to the opposite portions of the upper cylindrical casing 12 respectively.

These upper and lower cylindrical casings 12 and 16 are made of synthetic resin such as polyacetale resin and polyamide resin.

A buffer 14 is integrally inserted into the annular cavity 12c of the upper cylindrical casing 12. An outer diameter $D_1$ of an upper metal race 20 is a little larger than an outer diameter $D_2$ of a lower metal race 22, and is also accurately concentric with respect to a sliding channel 20a of the upper metal race 20.

On the other hand, an inner diameter $d_2$ of the lower metal race 22, into which the shock absorber rod 37 is inserted, is a little smaller than an inner diameter $d_1$ of the upper metal race 20, and is also accurately concentric with respect to the sliding channel 22a of the lower metal race 22.

An upper face 20b of the upper metal race 20 and a lower face 22b of the lower metal race 22 are traversely planar. Each of the sliding channel 20a and 22a has a semidiameter which is larger than that of a ball 24, and each of the side faces of the upper and lower races 20 and 22 is processed to have a smooth surface respectively. A series of balls 24 are held rotatably and at equal spaces between the sliding channels 20a and 22a.

The upper race 20 is held in the annular cavity 12c of the upper cylindrical casing 12 with the buffer 14 interposed between the casing 12 and the upper race 20, and the lower race 22 is held in the annular cavity 16d to obtain the thrust ball bearing unit 10.

The upper and lower casings 12 and 16 are tightly connected with each other with a labyrinth seal or contact seal. The inner peripheral wall 12d of the upper casing 12 is located near the inner diameter than the inner peripheral wall 16e of the lower casing 16. The inwardly extending lip 16f of the lower casing 16 and the inner peripheral wall 12d of the upper casing 12 are engaged with each other with a minor gap therebetween or they are in contact with each other.

As explained in the foregoing paragraph, the tapered lip 12f of the inner peripheral wall 12d is proximate to or in contact with the lip 16f of the lower casing 16. A stepped cavity 16g is formed in the bottom and neighboring portion of the lip 16f. An inner diameter $d_4$ of the lower casing is slightly larger than an inner diameter $d_3$ of the upper casing 12.

The lower portion of the outer peripheral wall 12a is projects radially inwardly and forms the lip 12b which is proximate to the outer peripheral wall 16b having the lip 16c. An inner diameter of the lip 12b is a little smaller than an outer diameter of the lip 16c. As is clear from this explanation, the sealing portions of the upper and lower casings 12 and 16 are snapfitted with each other to obtain the integral thrust ball bearing unit 10.

A pair of the substantially rectangular dent portions 12h are formed diametrically in the upper face of the upper casing 12 for receiving the head of each screw bolt and also for mounting a strut on the body 33. It is not necessary to provide such a dent portion for the thrust ball bearing unit having a strut and a mounting screw bolt, the head of which does not project out of the upper casing 12.

Figure 2:
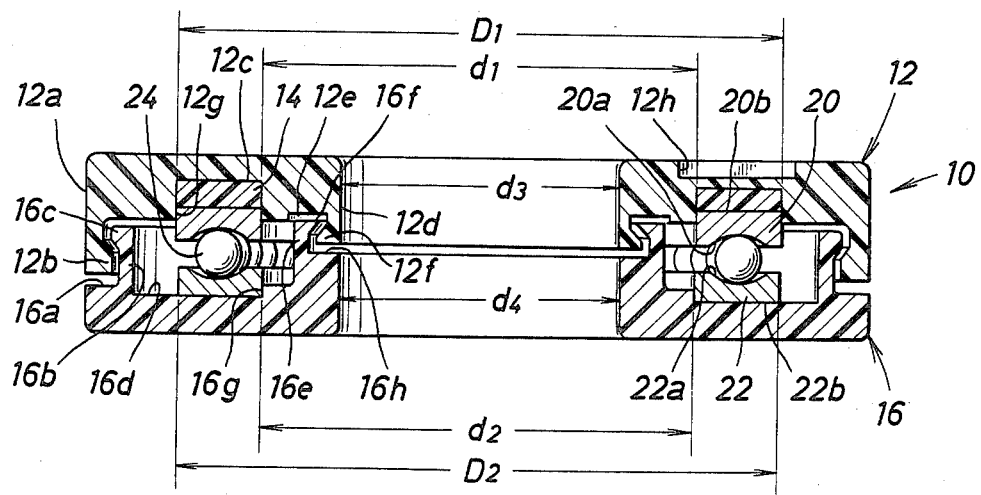
FIG. 2 is a longitudinal section view of a thrust ball bearing unit taken along line II—II of FIG. 1.
Figure 3:
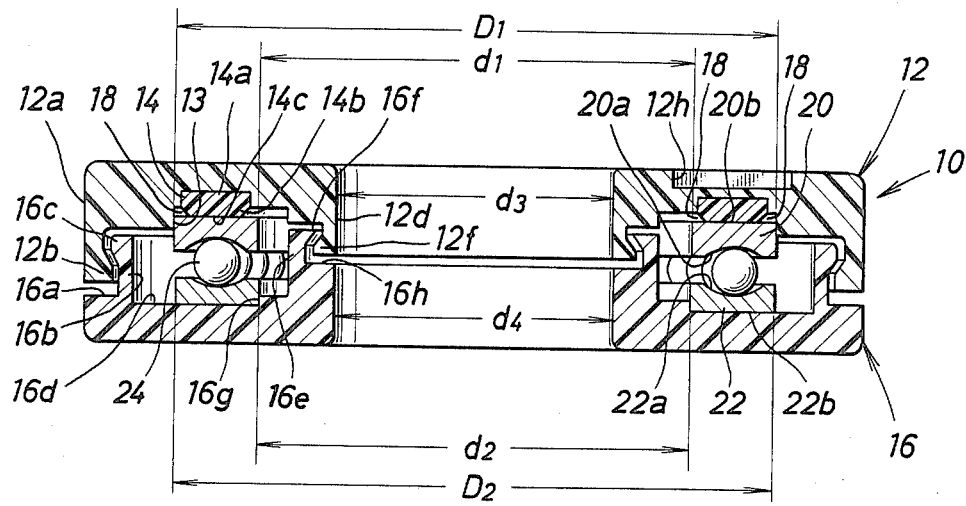
FIG. 3 is a longitudinal section view of another embodiment of a thrust ball bearing unit according to the present invention.

FIG. 3 is a longitudinal section view of another embodiment of the thrust ball bearing unit of this invention, wherein an annular cavity 13 is circumferentially shaped to communicate with the annular cavity 12c so that a pair of stepped edges are circumferentially formed along both of the bottom portions of the cavity 12c. Contrary to the embodiment shown in FIG. 2, only a rectangular portion 14a of the buffer 14 having a trapezoidal portion 14b and a flat bottom face 14c is fitted into the cavity 12c so that the trapezoidal portion 14b partially protrudes into the annular cavity 13 and two gaps 18 are formed along both sides of the trapezoidal portion 14b respectively.

Figure 4:
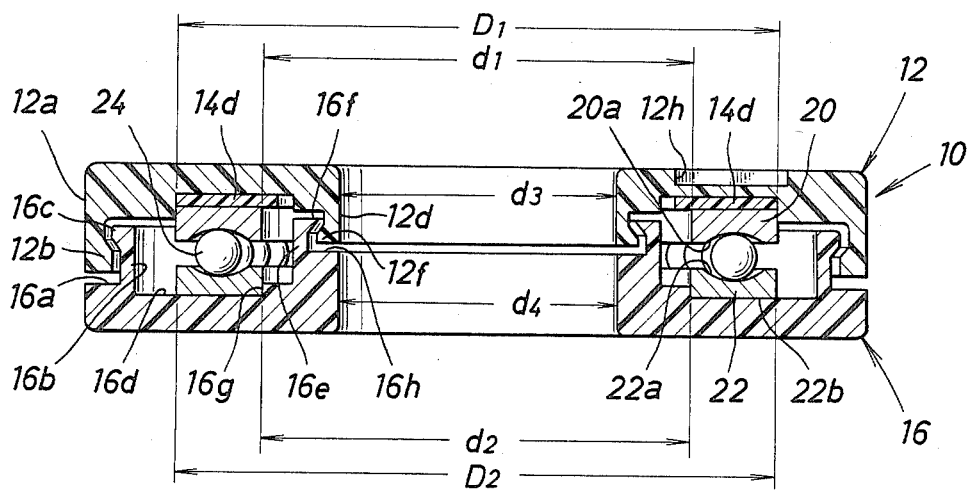
FIG. 4 is a longitudinal section view of still another embodiment of a thrust ball bearing unit of this invention.

FIG. 4 is a longitudinal section view of still another embodiment of the thrust ball bearing unit of this invention, wherein the annular cavity 12c shown in FIGS. 2 and 3 is not formed into the upper casing 12, but a thin buffer ring 14d having a wide plate section is fitted in the annular cavity of the upper casing 12. The width of the thin buffer ring 14d is either equal to or larger than that of the upper race 20. Each buffer 14 is made of material having a large anticreep distortion.

The buffers 14-14d shown in FIGS. 2-4 are made of elastic bodies fabricated from material such as rubber or soft synthetic resin which is softer than the material of the upper race 20, gasket material (inclusive of viscous material impregnated gasket material) or steel mesh.

The thrust ball bearing unit 10 shown in FIGS. 1-4 is used in the upper mount 34 for mounting the suspension to the body 33 of an automobile. Even if the upper casing 12 is distorted by the roughness of the upper mount 34, the distortion of the upper race 20 is decreased by the synthetic resin upper casing 12, and in addition a possible distortion of the buffer 14 may be absorbed and not transmitted to the upper race 20. Accordingly, the upper race 20 is hardly deformed.

The rolling vibration is hard to produce with the thrust ball bearing unit 10, but even if produced by the worn ball bearings 24 after long use, the rolling vibration is almost entirely absorbed by the buffer 14 and will not be transmitted to the body 33.

In the embodiment shown in FIG. 2, both the buffer 14 and the upper race 20 are integrally fitted into the annular cavity 12 of the upper casing 12 so that very soft material may be effectively employed as the buffer 14.

In the embodiment shown in FIG. 3, the buffer 14 having rectangular portion 14a and a trapezoidal protruding portion 14b will be greatly distorted, when the automobile with an excess load is bumped, in order to absorb the shock.

In the embodiment shown in FIG. 4 having a thin and wide buffer ring 14d, the durability of the bearing is increased when a material having a splendid anticreep distortion is adopted for the buffer 14d.

In any of the embodiments shown in FIGS. 2-4, the buffer 14 is interposed between the upper casing 12 and the upper race 20. But it may be preferable to interpose the buffer 14 between the lower race 22 and the lower casing 16. Alternatively, two buffers 14 are interposed between the upper casing 12 and the upper race 20 and also between the lower race 22 and the lower casing 16 respectively.

In accordance with the thrust ball bearing unit 10 of this invention, the buffer 14 is interposed between the synthetic resin casing and the race so that the distortion of the synthetic resin casing caused by the roughness of the upper mount 34 can be decreased, the distortion may be absorbed by the buffer 14, and the races are hardly distorted.

Impact load thus applied may be decreased by the synthetic resin casings, and the remaining impact load is absorbed by the buffer 14 so as to prevent transmission of excess impact load and shock to the races. It is easy to assemble the thrust ball bearing unit since the buffer 14 is integrally inserted into the synthetic resin casings 12 and 16.

The peripheral sealing portion of the lower casing 16 is integrally covered by the peripheral sealing portion of the upper casing 12 to assemble the thrust ball bearing unit 10 so that foreign matter may be prevented from penetrating into the unit 10 itself.

During assembling, the inner peripheral sealing portions of the upper and lower casings 12 and 16 are somewhat deformed and push-fitted so that the parts are held together, and they are in friction contact with each other.

In addition, the push-fit engagement between the peripheral sealing portions of the upper and lower casings 12 and 16 can make the labyrinth gap as narrow as possible to obtain a great dustproof effect. According to the conventional thrust bearing unit, the labyrinth seal was made from a metal plate so that the peripheral sealing portions could not have been push-fitted, and the labyrinth seal gap was not narrow enough to have a great dustproof effect.

Figure 5:
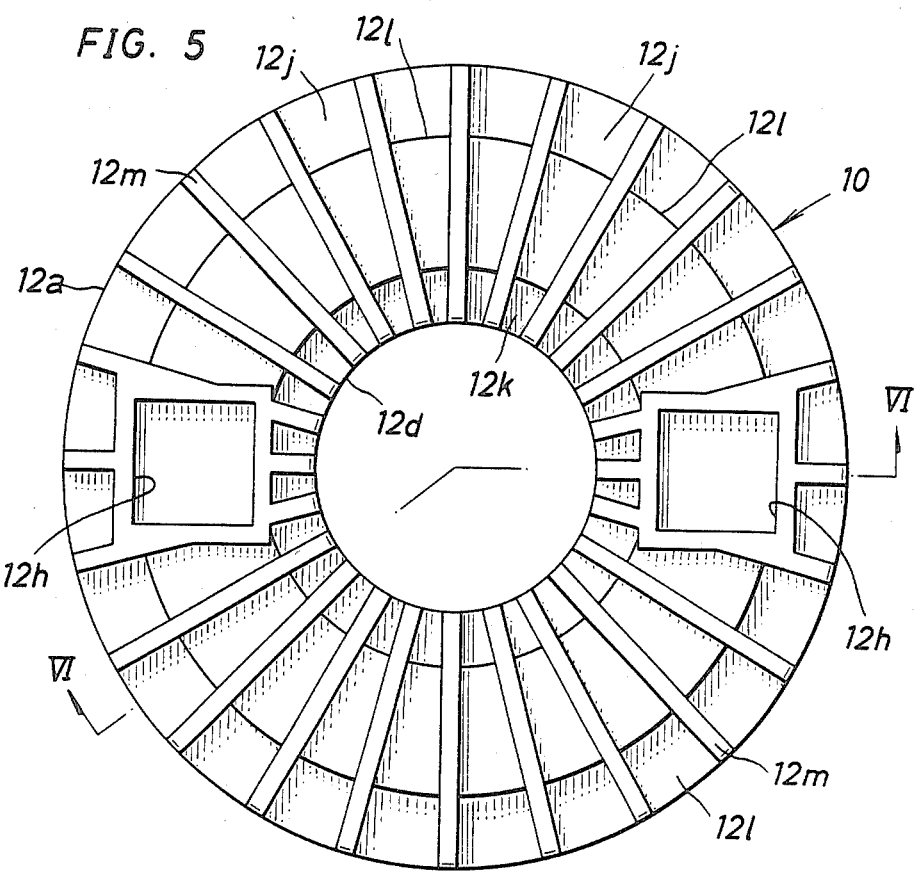
FIG. 5 is a plan view of a thrust ball bearing unit constructed in accordance with another embodiment of the present invention.
Figure 6:
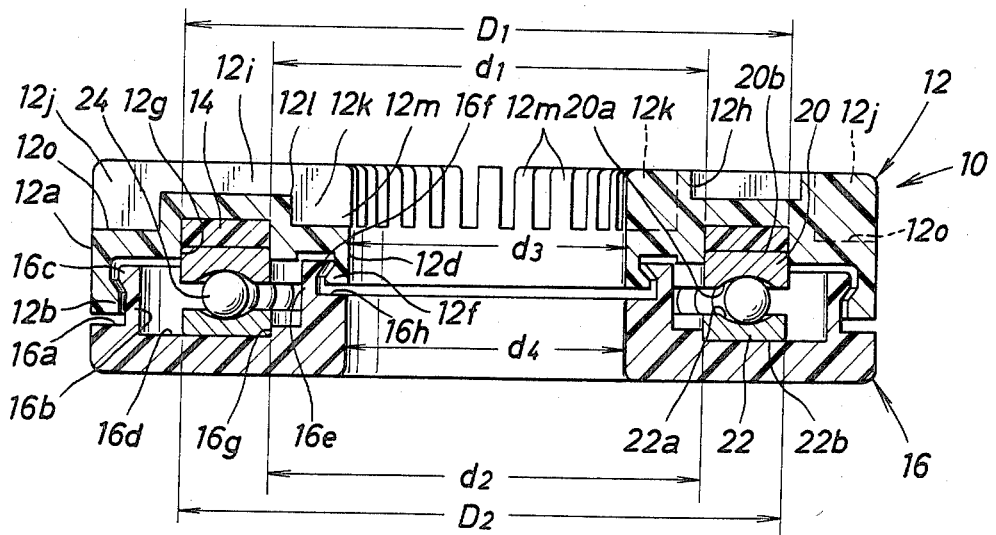
FIG. 6 is a longitudinal section of a thrust ball bearing unit taken along line VI—VI of FIG. 5.

Another embodiment of this invention is shown in FIGS. 5 and 6, wherein a circumferential groove 12i is shaped into the upper face of the ringed upper casing 12 to define a pair of outer and inner deep peripheral portions 12j and 12k, and also a circumferential rectangular projection 12l between these outer and inner peripheral portions. A pair of the substantially rectangular dent portions 12h are diametrically provided, and also a number of ribs 12m are radially formed on and traverse the upper face with the center of the upper casing 12 as their centers. All of the ribs 12m each have a planar upper face disposed at the same level. Each rib 12m should have a shape and size to deform itself and to transmit the equalized load to the bottom portion 12o of the casing 12 even when ill-balanced impact is roughly applied on the ribs 12m.

The buffer 14 and the upper race 20 are fitted into the annular groove cavity 12c of the ringed upper cylindrical casing 12, and the lower race 22 is held in the annular cavity 16d of the ringed lower casing 16.

Figure 7:
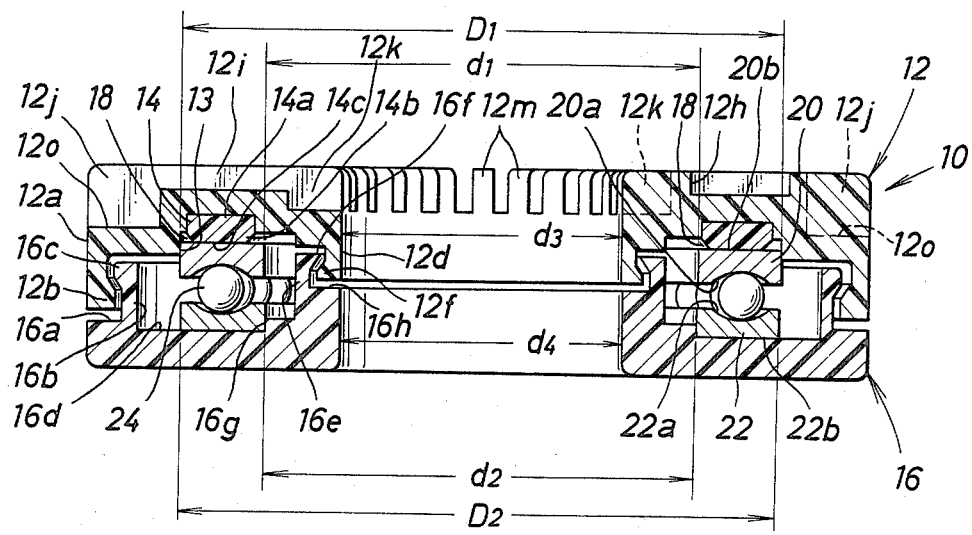
FIG. 7 is a longitudinal section view of another embodiment of a thrust ball bearing unit according to the present invention.
Figure 8:
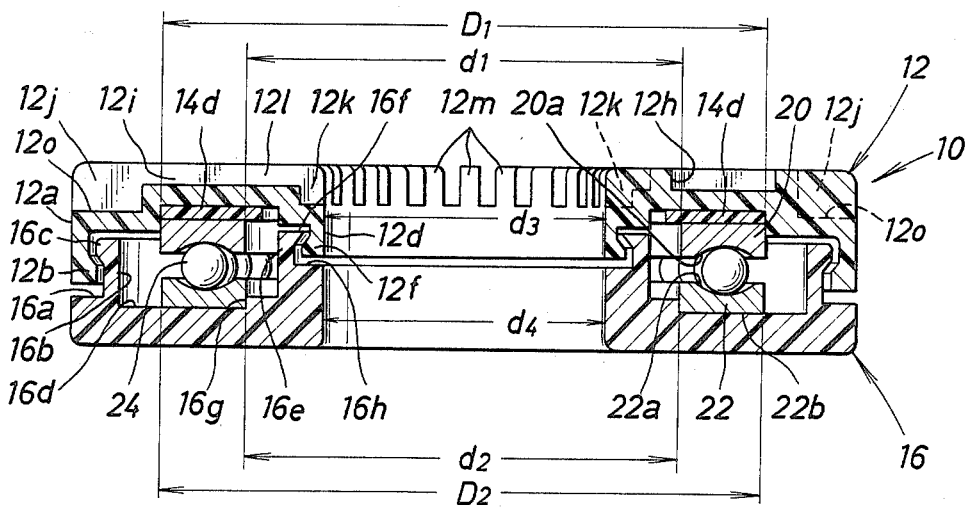
FIG. 8 is a longitudinal section view of still another embodiment of a thrust ball bearing unit of this invention.

In FIG. 7, an annular cavity 13 is circumferentially shaped to communicate with the annular groove 12c so that a pair of stepped edges are circumferentially formed along the bottom portions of the groove 12c. Only a rectangular portion 14a of the buffer 14 having a trapezoidal portion 14b is fitted into the groove 12c so that the trapezoidal portion 14b partially protrudes into the annular cavity 13 and both gaps 18 are formed along both sides of the trapezoidal portion 14b.

Figure 9:
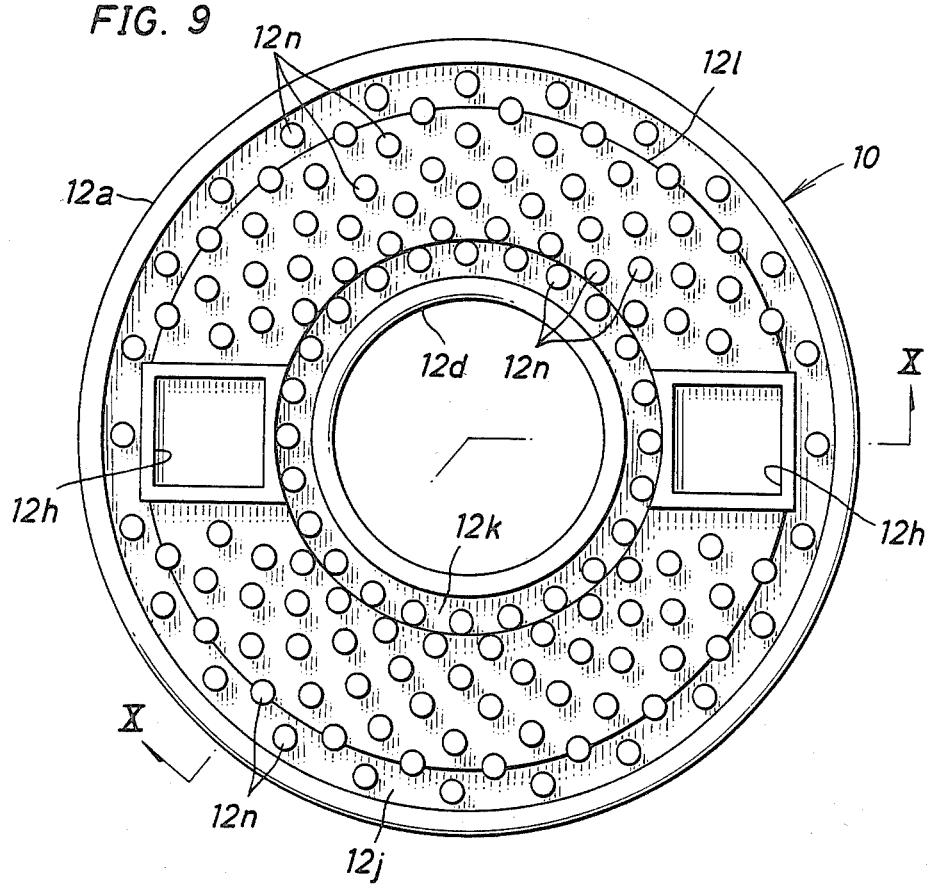
FIG. 9 is a plan view of a thrust ball bearing unit constructed in accordance with still another embodiment of the present invention.
Figure 10:
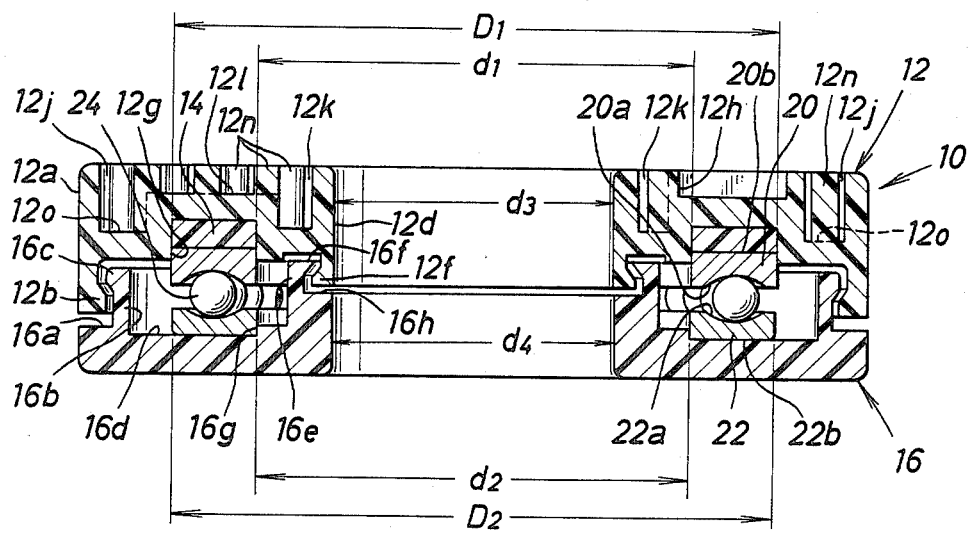
FIG. 10 is a longitudinal section view of a thrust ball bearing unit taken along line X—X of FIG. 9.
Figure 16:
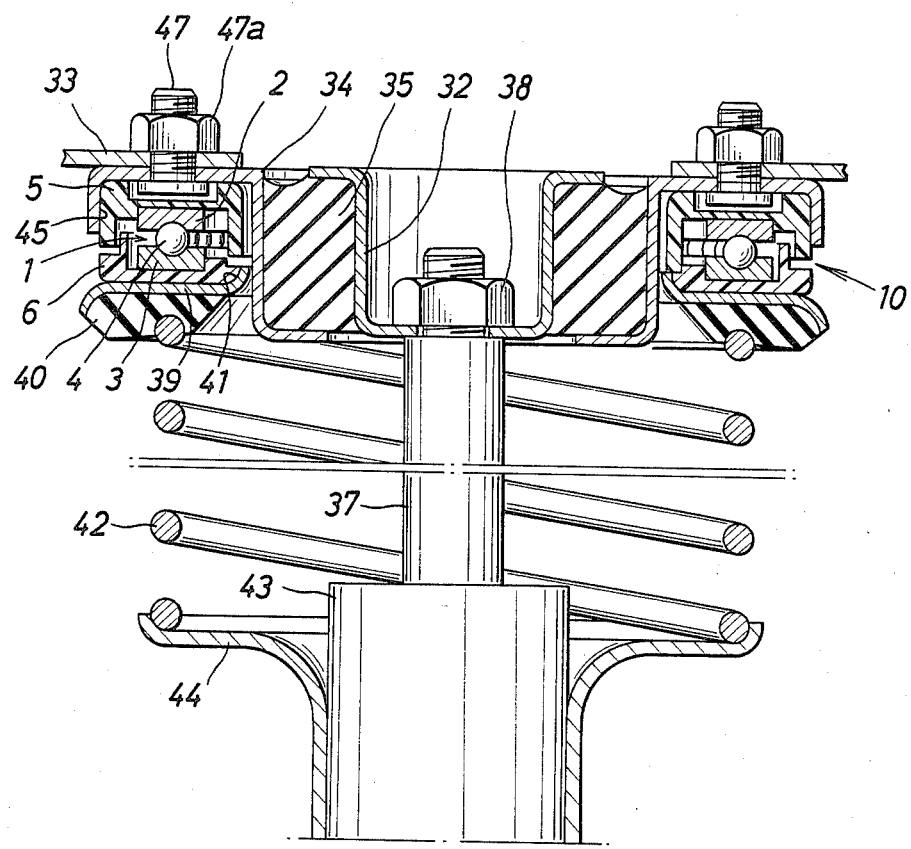
FIG. 16 is a longitudinal cross section view, partly cut away of an automobile suspension including a conventional thrust ball bearing unit.

In FIGS. 9 and 10, an upward wide annular cavity 12i is circumferentially formed in an upper face of the ringed cylindrical upper casing 12, a rectangular projection 12l is circumferentially shaped on the bottom portion 12o of the upper casing 12 to define a pair of deep grooves 12j and 12k along the outer and inner peripheral walls 12a and 12d and a plurality of circular strips of male lugs 12n, each circular strip including a number of equally spaced male lugs 12n, are circumferentially provided in the upper portion of the upper casing 12 and extend parallel to one another.

The thrust ball bearing unit 10 shown in FIGS. 1-5 is used in the upper mount 34 for mounting the suspension to the body 33 of the automobile.

Even when unbalanced load is abruptly given on the upper mount 34, the radial ribs 12j or the circular strips of the male lugs 12n are pushed strongly by the rough seat of the upper mount 34 without distorting the bottom portion 12o of the upper casing 12. Accordingly, the applied impact does not distort the upper and lower races 20 and 22. If the bottom portion 12o is distorted, the buffer 14 will absorb the distortion without causing any distortion of the races 20 and 22 or rolling vibration noise. Even if the rolling vibration noise is caused by the thrust ball bearings after long use, it will be absorbed by the buffer 14 and will not be transmitted to the body 33.

When the automobile with an excess load is bumped, radial ribs 12j or the circular strips of the male lugs 12n will decrease impact and the buffer 14 will absorb the impact so that the excess impact load will not be transmitted to the thrust ball bearings.

In the embodiment shown in FIG. 10, both the buffer 14 and the upper race 20 are integrally fitted into the annular groove 12c in such a way that the buffer 14 is interposed between the upper casing 12 and the upper race 20 so that very soft material may be effectively employed as the buffer 14.

In the embodiment shown in FIG. 7, the buffer 14 having the trapezoidal portion 14b will be greatly distorted, when the automobile with an excess load is bumped in order to absorb the shock.

In the embodiment shown in FIGS. 6-10, the buffer 14 is interposed between the upper casing 12 and the upper race 20, and the outer peripheral wall 12a is provided on the bottom portion 12o, but it may be preferable to locate the buffer 14 between the lower race 22 and the lower casing 12, or to interpose the buffer 14 between the upper casing 12 and the upper race 20, and also between the lower race 22 and the lower casing 16.

Alternatively, the buffer 14 is fitted into the upper casing 12 having no outer peripheral wall on the bottom portion 12o, but the outer peripheral wall is provided on the bottom plate of the lower casing 16. Accordingly, the buffer 14 fitted into the upper and lower casings and the outer peripheral walls on the bottom plate are freely coupled with each other.

The radial ribs 12m may traverse the bottom portion 12o of the upper and lower casings 12 and 16 as shown in FIGS. 11 and 12. More particularly, a pair of ridged ribs 12p are circumferentially formed along and traverse the outer and inner peripheral walls of the upper casing 12 and the lower casing 16 respectively, and the upper portion of each radially provided rib 12m protrudes out of the ridged ribs 12p. This construction increases stiffness of both the upper and lower casings 12 and 16 so that the top portion of the radial rib 12m can be fitted on the seat of the opposite upper mount 34.

In FIG. 12, the outer end of each of the trapezoidal ribs 12m has a width W which is substantially the same as those of the upper and lower races 20 and 22. In this way, the trapezoidal ribs 12m may be easily bend in accordance with the seat of the opposite upper mount 34, thus decreasing the shock applied thereto.

While an embodiment of this invention has been described, it is obvious that variations and modifications are possible without departing from the invention. It is desired to cover all such forms of the invention as would be apparent to one skilled in the art, and that come within the scope of the appended claims.

What is claimed is:

1. A thrust ball bearing unit comprising:
a ring-shaped cylindrical upper casing comprised of a synthetic resin, said upper casing including an outer peripheral wall having an inwardly extending lip, an annular cavity and an inner peripheral wall having an outwardly extending lip;
a ring-shaped cylindrical lower casing comprised of a synthetic resin, said lower casing including an outer peripheral wall having an outwardly extending lip, an annular cavity, and an inner peripheral wall having an inwardly extending lip;
an upper race extending in said annular cavity of said upper casing;
a lower race extending in said annular cavity of said lower casing;
a series of balls extending between said upper and said lower races;
a buffer extending between at least one of
said upper casing and said upper race and
said lower casing and said lower race; and
said upper casing and said lower casing being engaged tightly with each other with labyrinth sealing portions being defined therebetween, said labyrinth sealing portions comprised of said inwardly and said outwardly extending lips of said upper casing and said outwardly and said inwardly extending lips of said lower casing.

2. A thrust ball bearing unit as claimed in claim 1, wherein said upper casing includes an annular groove extending therein that is open to said annular cavity at a bottom portion thereof.

3. A thrust ball bearing unit comprising:
a ring-shaped cylindrical upper casing comprised of a synthetic resin, said upper casing including an outer peripheral wall having an inwardly extending lip, an annular cavity, and an inner peripheral wall having an outwardly extending lip;
a ring-shaped cylindrical lower casing comprised of a synthetic resin, said lower casing including an outer peripheral wall having an outwardly extending lip, an annular cavity, and an inner peripheral wall having an inwardly extending lip;
an upper race extending in said annular cavity of said upper casing;
a lower race extending in said annular cavity of said lower casing;
a series of balls extending between said upper and said lower races;
a buffer extending between at least one of said upper casing and said upper race and said lower casing and said lower race;
said upper casing and said lower casing being engaged tightly with each other with labyrinth sealing portions being defined therebetween, said labyrinth sealing portions comprised of said inwardly and said outwardly extending lips of said upper casing and said outwardly and said inwardly extending lips of said lower casing; and
a plurality of projections extending from at least one of an upper face of said ring-shaped upper casing and a lower face of said ring-shaped lower casing.

4. A thrust ball bearing unit as claimed in claim 3, wherein said plurality of projections comprise a plurality of ribs radially extending on and traversing said at least one of said faces of said cylindrical casings.

5. A thrust ball bearing unit as claimed in claim 3, wherein said plurality of projections comprise a plurality of ribs radially extending on and traversing each of said faces of said cylindrical casings.

6. A thrust ball bearing unit as claimed in claim 3, wherein said plurality of projections comprise a plurality of male lugs formed on said at least one of said faces of said cylindrical casings.

7. A thrust ball bearing unit as claimed in claim 3, wherein said plurality of projections comprises a plurality of male lugs formed on each of said faces of said cylindrical casings.

8. A thrust ball bearing unit as claimed in claim 3, wherein one of said cylindrical casings further includes a pair of rectangular or circular cavities formed diametrically on a respective said face of said one of said cylindrical casings.

* * * * *